(12) United States Patent
Coull et al.

(10) Patent No.: US 12,603,904 B1
(45) Date of Patent: Apr. 14, 2026

(54) CYBER-THREAT ANALYSES USING MACHINE LEARNING AND PRIOR OBSERVATIONS

(71) Applicant: Google LLC, Mountain View, CA (US)

(72) Inventors: Scott Eric Coull, Cary, NC (US); Jeffrey Thomas Johns, Leesburg, VA (US)

(73) Assignee: GOOGLE LLC, Mountain View, CA (US)

( * ) Notice: Subject to any disclaimer, the term of this patent is extended or adjusted under 35 U.S.C. 154(b) by 451 days.

(21) Appl. No.: 17/855,272

(22) Filed: Jun. 30, 2022

Related U.S. Application Data

(60) Provisional application No. 63/282,676, filed on Nov. 23, 2021.

(51) Int. Cl.
| | |
|---|---|
| *H04L 29/06* | (2006.01) |
| *H04L 9/40* | (2022.01) |
| *H04L 41/16* | (2022.01) |
| *H04L 41/22* | (2022.01) |

(52) U.S. Cl.
CPC .......... *H04L 63/1425* (2013.01); *H04L 41/16* (2013.01); *H04L 41/22* (2013.01)

(58) Field of Classification Search
CPC . H04L 63/1425; H04L 63/1441; H04L 41/22; H04L 63/14
See application file for complete search history.

(56) References Cited

U.S. PATENT DOCUMENTS

| | | | | |
|---|---|---|---|---|
| 11,356,472 | B1 * | 6/2022 | Maiorana ............ | H04L 63/1416 |
| 2016/0036844 | A1 * | 2/2016 | Kopp .................... | G06N 5/045 |
| | | | | 726/1 |
| 2017/0365027 | A1 * | 12/2017 | Hein ..................... | H04W 4/029 |
| 2018/0083988 | A1 * | 3/2018 | Kataoka .............. | H04L 63/1416 |
| 2019/0379642 | A1 * | 12/2019 | Simons ............... | H04L 63/0281 |
| 2020/0027337 | A1 * | 1/2020 | Cruz Huertas ...... | G08B 27/003 |
| 2021/0034865 | A1 * | 2/2021 | Nord .................... | G06V 10/809 |

(Continued)

OTHER PUBLICATIONS

FireEye (Apr. 20, 2021). "Eye on Security—The Inception of Mandiant Advantage," Transcription of Podcast, 9 total pages [the third full paragraph on p. 6 of this document reflects information that was available under 35 U.S.C. § 102(a)(1) at least as of Nov. 23, 2020].

(Continued)

*Primary Examiner* — Dao Q Ho
(74) *Attorney, Agent, or Firm* — DORITY & MANNING, P.A.

(57) ABSTRACT

A cyber-security analysis method uses machine learning (ML) technology to classify cyber-threat indicators, for example, as malicious or benign, by generating a threat score. The method includes receiving, at a compute device, a cyber-threat indicator (IUE) and associated verdicts from a set of sources. Augmenting the verdicts associated with the IUE with verdicts associated with at least one related indicator having a defined relationship with the IUE. The relationship between the IUE and the at least one related indicator can be operational, e.g., based on an administrative domain, or functional, e.g., based on a protocol specification. The cyber-threat score is generated for the IUE based on the ML model and the combined verdicts of the IUE and the at least one related indicator.

21 Claims, 4 Drawing Sheets

(56)  References Cited

U.S. PATENT DOCUMENTS

| 2022/0076347 | A1* | 3/2022 | Trainor | G08B 21/182 |
|---|---|---|---|---|
| 2022/0121429 | A1* | 4/2022 | Haile | G06N 3/08 |
| 2022/0383038 | A1* | 12/2022 | Hines | G06N 3/08 |
| 2023/0139718 | A1* | 5/2023 | Valipour | G06N 3/006 |
| | | | | 706/12 |

OTHER PUBLICATIONS

FireEye—Mandiant (May 2021). "New Developments in Mandiant Advantage Threat Intelligence," in the Vision Newsletter—11th Edition, pp. 22-24 [pp. 22-24 of this document reflect information that was available under 35 U.S.C. § 102(a)(1) at least as of Nov. 23, 2020].

Lenaerts-Bergmans, B. (Feb. 2021). "Mandiant advantage's publicly known index credit scoring," FireEye Blog, located at https://www.fireeye.com/blog/jp-products-and-services/2021/02/mandiant-advantage-delivers-free-confidence-scoring-for-publicly-known-indicators.html, 4 total pages [this document reflects information that was available under 35 U.S.C. § 102(a)(1) at least as of Nov. 23, 2020].

Information described in paragraph [0021], the first two sentences of paragraph [0022], and paragraph [0023] of the present application, U.S. Appl. No. 17/855,255, was available under 35 U.S.C. § 102(a)(1) at least as Nov. 23, 2020.

* cited by examiner

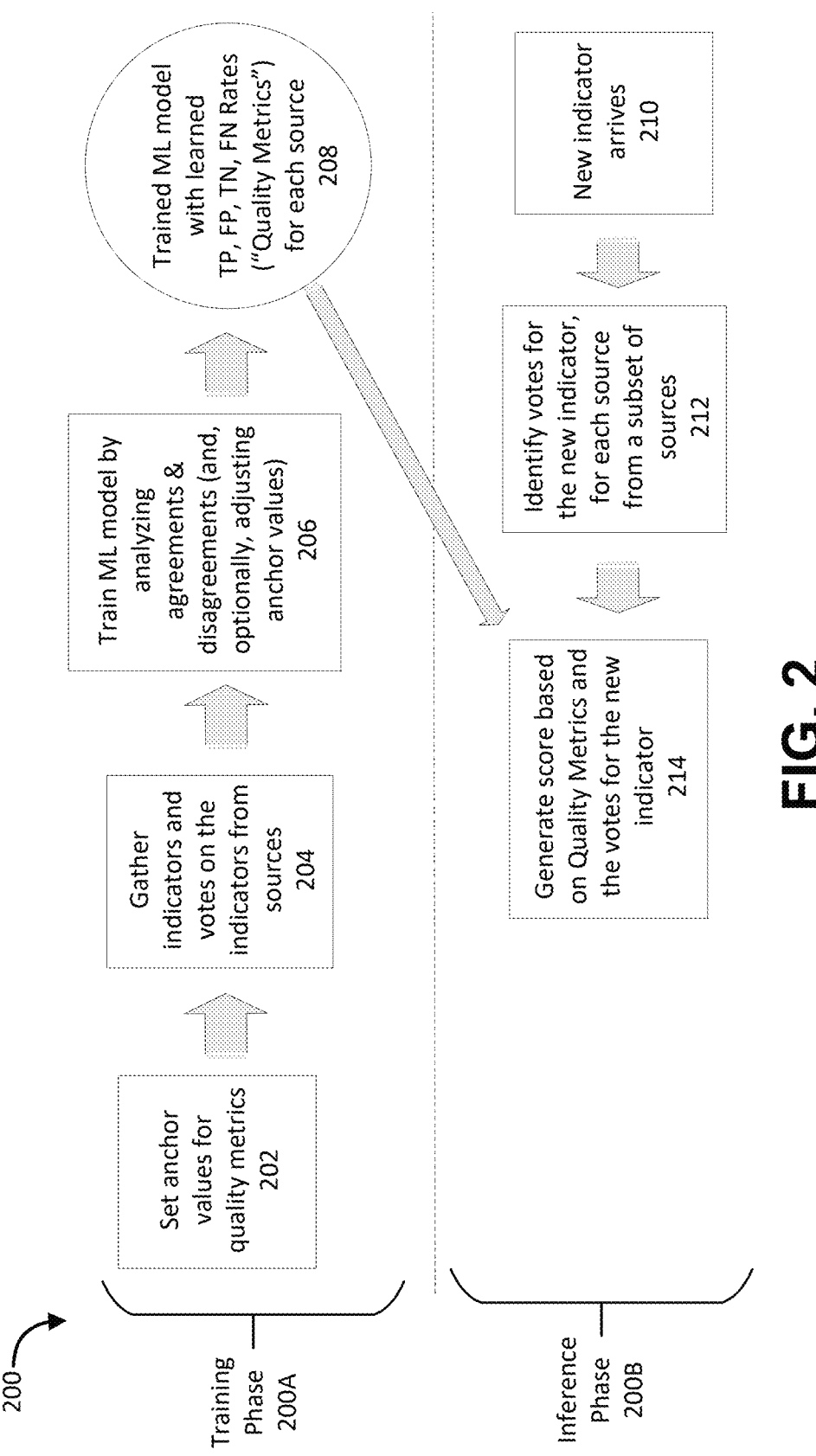

FIG. 2

Trained ML model with learned TP, FP, TN, FN Rates ("Quality Metrics") for each source 208

New indicator arrives 210

Train ML model by analyzing agreements & disagreements (and, optionally, adjusting anchor values) 206

Identify votes for the new indicator, for each source from a subset of sources 212

Gather indicators and votes on the indicators from sources 204

Generate score based on Quality Metrics and the votes for the new indicator 214

Set anchor values for quality metrics 202

200

Training Phase 200A

Inference Phase 200B

Analyst Terminal(s) 320B

Analyst Terminal(s) 320A

Cyber-Threat Scores 322B

Remote Source(s) 324

Admin A

Cyber-Threat Scores 322A

Network N

Unlabeled Dataset(s) 326

Cyber-Threat Score Generator 310

User Interface 318

Processor 314

Transceiver 316

Memory 312

Sources 312A

Votes 312B

Indicators 312C

Anchor Values 312D

Cyber-Threat Scores 312E

Quality Metrics 312F

Instructions 312G

300

400

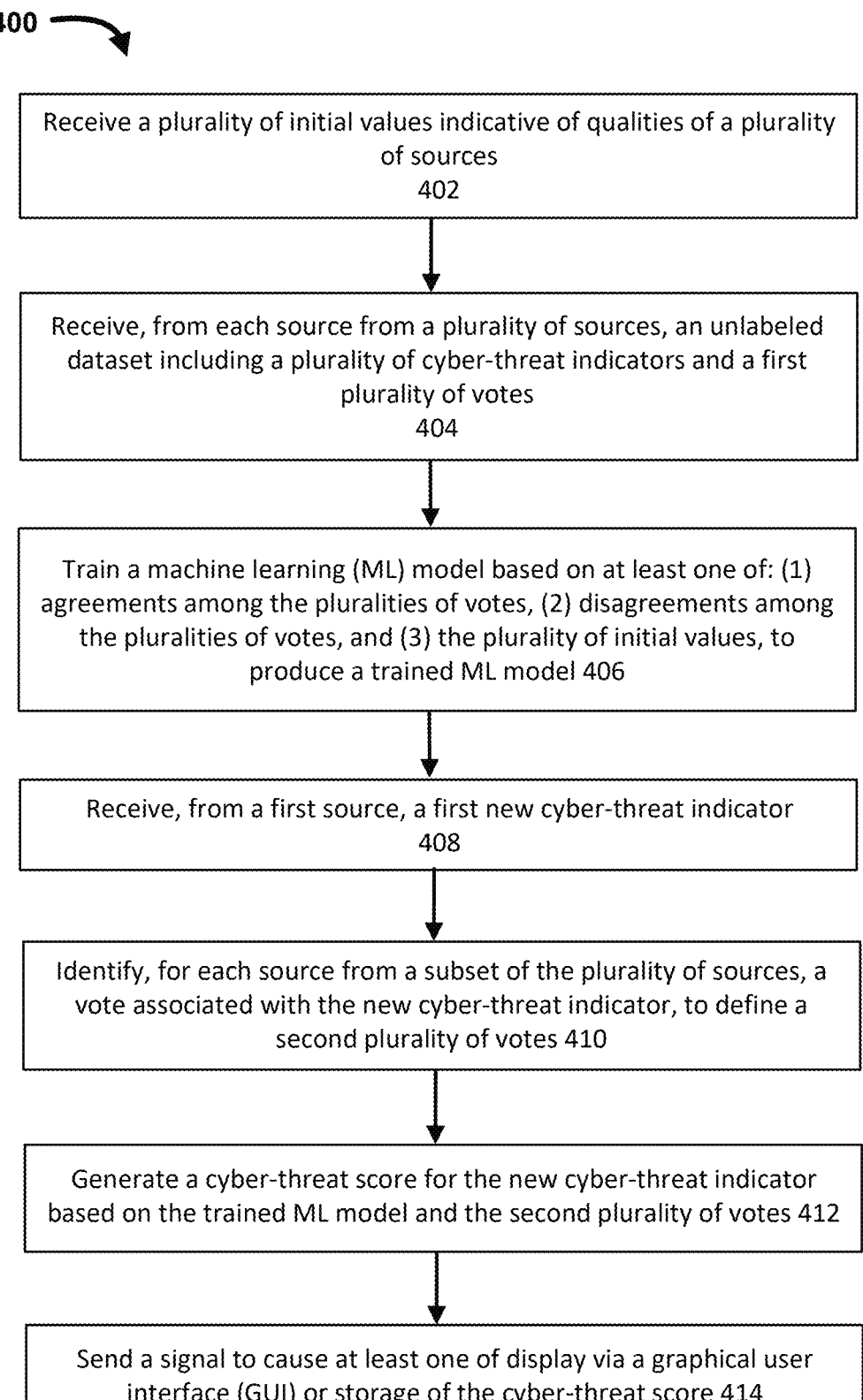

Receive a plurality of initial values indicative of qualities of a plurality of sources
402

Receive, from each source from a plurality of sources, an unlabeled dataset including a plurality of cyber-threat indicators and a first plurality of votes
404

Train a machine learning (ML) model based on at least one of: (1) agreements among the pluralities of votes, (2) disagreements among the pluralities of votes, and (3) the plurality of initial values, to produce a trained ML model 406

Receive, from a first source, a first new cyber-threat indicator
408

Identify, for each source from a subset of the plurality of sources, a vote associated with the new cyber-threat indicator, to define a second plurality of votes 410

Generate a cyber-threat score for the new cyber-threat indicator based on the trained ML model and the second plurality of votes 412

Send a signal to cause at least one of display via a graphical user interface (GUI) or storage of the cyber-threat score 414

FIG. 4

CYBER-THREAT ANALYSES USING MACHINE LEARNING AND PRIOR OBSERVATIONS

CROSS-REFERENCE TO RELATED APPLICATIONS

This application claims priority to and the benefit of U.S. Provisional Patent Application No. 63/282,676, filed Nov. 23, 2021 and titled "Cyber-Threat Score Generation Using Machine Learning," the entire contents of which are incorporated herein by reference in their entirety.

This application is related to U.S. patent application Ser. No. 17/855,255, entitled "Cyber-Threat Analysis Using Machine Learning and Prior Observations", filed herewith on the same day, the entire contents of which are incorporated herein by reference in their entirety.

TECHNICAL FIELD

This disclosure relates generally to the field of cybersecurity, and more particularly to application of machine learning to cybersecurity threat evaluation and response.

BACKGROUND

Cybersecurity threats (cyber-threats) are malicious events or acts that can include attempts (whether or not successful) at unauthorized access to or operations within a computer network and/or within intelligent devices connected within the computer network for communication (such as, for example, laptops, servers, smart phones, Internet-of-Things (IoT) devices, and other controllers, appliances and apparatus). Cyber threats can originate from outside or within a given organization's "trusted" proprietary network. Cyber-threats can include computer malware or human attackers and can take the form of data breaches, Denial of Service (DoS) attacks, and a growing variety of other types of attacks.

SUMMARY

Each source of a set of sources of cybersecurity event data (e.g., cybersecurity detection devices) has a latent notion of quality in terms of whether the source is capable of accurately identifying and classifying cyber-threat indicators, e.g., as benign or malicious. A cyber-security analysis method and system as described below can quantify the quality in terms of quality metrics, for example, true positive (TP), false positive (FP), true negative (TN) and false negative (FN) rates. This can be achieved for each source, in some embodiments, without hard labels on the data and in an unsupervised manner. As used herein, "quality" encompasses the concepts of credibility, trustworthiness, and/or reliability.

Embodiments of the invention can employ a machine learning (ML) model to classify indicators, while taking into account the quality of the sources. During training of the ML model, these initial quality estimates are used as parameters for the ML model and can be adjusted during training. The quality metrics can be described as latent or hidden because they are typically not overtly known but rather inferred through the training process employed for the ML model. Once the model is trained, the quality metrics (now called 'learned quality metrics') can be combined into a single probability, where each source "votes" on a classification and its vote is weighted by the learned quality metrics and aggregated with those of the other sources. Thus, for example, a source that votes for 'malicious' with a low TP rate influences the final classification less than a source that votes 'benign' with a high TN rate.

A cyber-threat score for an indicator can be generated based on the classification results produced by the ML model, which incorporates the quality metrics associated with the sources. The cyber-threat score represents a measure of confidence that the corresponding threat indicator signals an actual and actionable cyber-attack. The cyber-threat score can be provided, for example, to a security analyst to inform decisions regarding actions to be taken in response to cyber-threats, such as issuing or prioritizing alerts and/or selecting, prioritizing, or initiating remediations. In other embodiments, automated actions can be taken in response, e.g., to the cyber-threat score exceeding a threshold.

In an embodiment of the invention, a cyber-security analysis method includes receiving, at a compute device, (1) a set of initial quality values (also called anchor values) indicative of estimates of qualities of each of a set of sources, and these can be used to initialize the ML model, and (2) an unlabeled data set including a first set of cyber-threat indicators and cyber-security classifications or verdicts that serve as votes from sources in the set of sources. Each of the votes is associated with one of the cyber-threat indicators, and each vote from the first set of votes relates to a classification of a corresponding cyber-threat indicator. The classification can place the corresponding cyber-threat indicator in any of a plurality of predetermined classes, such as (a) malicious or benign or (b) malicious, suspicious or benign. In one embodiment, an ML model is trained using an unlabeled training data set, and based on (i) at least one of agreements among the sets of votes, and disagreements among the sets of votes, and (2) the set of initial quality values, to produce a trained ML model. Optionally, the training of the ML model is also based on a regularization or constraint parameter, which indicates how far the ML model can deviate from the set of initial quality values.

During an inference phase, in response to receiving a new cyber-threat indicator, votes are identified for the new indicator from each source from a subset of the set of sources, to define in the aggregate a second set of votes. A cyber-threat score is generated for the new cyber-threat indicator based on the trained ML model and the second set of votes. The cyber-threat score can take the form of a probability that the indicator corresponds to a cyber-attack. More generally, the cyber-threat score can take the form of a probability that the indicator belongs to one of the classes voted on by the set of sources.

In various embodiments, generation of a cyber-threat score can be improved by recognizing that a cyber-threat indicator under examination ("IUE") can be part of a group of indicators with relationships within the group based on functional or operational factors. These relationships can be leveraged to improve the comprehensiveness of the votes. Accordingly, where vote(s) on an IUE from one or more sources as to classification of the cyber-threat indicator are lacking then votes regarding other related indicators within an indicator group can be used. This approach can improve the accuracy of the cyber-threat score generated for the IUE. The foregoing approach can be used to particular advantage in some embodiments permitting abstentions cast by sources rather than votes for a specific class.

In an embodiment applying this approach, score generation can advantageously employ a semantic graph with nodes representing indicators and edges representing semantic relationships among the nodes. This approach can identify functional relationships between groups of two or more of the nodes as defined by an applicable protocol specification. Accordingly, by way of illustration, within a Domain Name System ("DNS"), a particular human-readable domain name (DN) can resolve to a particular machine-readable IP address, or a particular URL serves a particular file. These relationships (DN to IP Address and URL to file) reflect actual interactions from the observed events or implied events due to the corresponding protocols. These interactions can be determined from the cyber-threat indicators related to the observed events using semantic graphs representing the events and relationships.

In yet another embodiment, which does not rely on semantic graphs, a group of indicators can be defined based on operational relationships among those indicators. The operational relationships can define a neighborhood, referred to as an administrative domain, comprising, for example, either an IP neighborhood or a domain neighborhood, as shown and described in the Appendix A under the heading "Guilt by Association." As is well known in the art, for IP addresses, an organization typically owns and runs one or more autonomous systems and each autonomous system typically handles routing of data for one or more IP subnets; and for domains, an organization typically owns domains/subdomains that they host using name servers that they run (or pay another entity to run for them). The inventors recognized that, if an IP address or domain is malicious (or, inversely, benign), then other indicators (alerts) originating within the same administrative domain may share the same classification. For example, if an IP address (host) has been breached, then other hosts within the same administrative domain have an increased likelihood of also be breached. Accordingly, the breached host as well as the other hosts may provide indicators related to the breach. With this being recognized, embodiments of the invention can use the known information regarding IP or domain indicators to inform classification of one or more other indicators originating within that same administrative domain (or neighborhood). For instance, if there is little or no information about a given IP address, we can look at increasingly larger administrative domains that encapsulate that IP address to gather votes for that IP addresses—e.g., first in the IP subnet, then in the autonomous system, and finally in the entire owning organization. The smaller the administrative domain to the IUE, the more likely classified indicators of that domain will bear on the classification of the IUE. A similar concept applies with domains—first in the name servers, and then in the owning organization.

In still other embodiments, the training of the ML model can use a smaller quantity of labeled data in addition to a relatively larger quantity of the unlabeled data. The labeled data reflects indicators that have been previously classified by a trusted security analyst or other expediency and appropriately labeled. That is, the labels constrain changes in the anchor values to ensure the quality metrics, as learned by the ML model, remain consistent with the ground truths represented by the labels.

BRIEF DESCRIPTION OF THE FIGURES

FIG. 2 is a block diagram showing an example machine learning based procedure for generating a cyber-threat score, according to an embodiment.

FIG. 4 is a flow chart showing a method for training an ML model and generating a cyber-threat score based on a new indicator, according to some embodiments.

DETAILED DESCRIPTION

Figure 1:
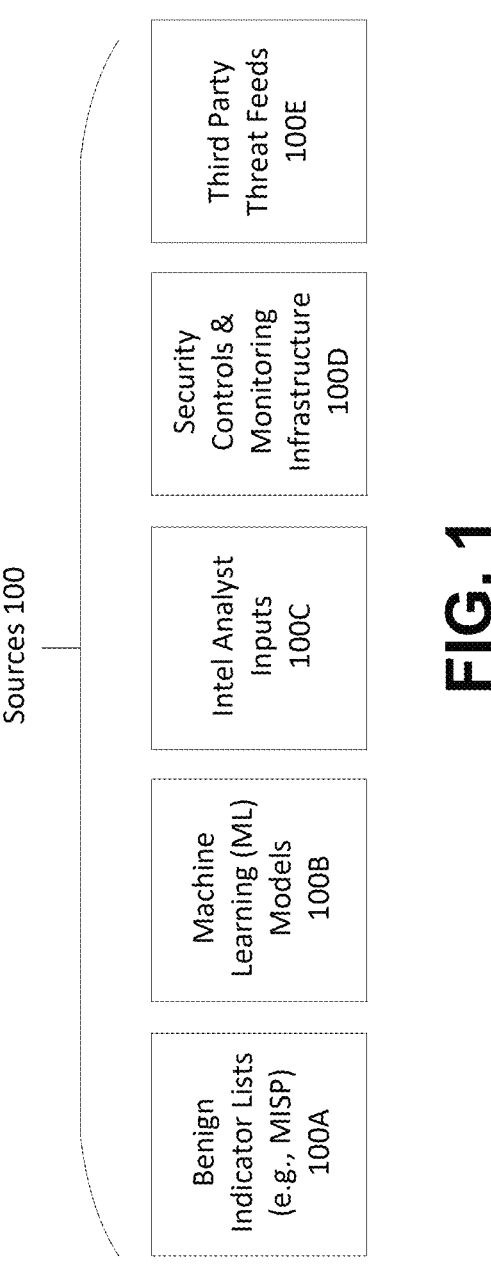
FIG. 1 is a block diagram showing an example set of sources, according to some embodiments.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details.

In the field of cyber-security, a key concept is a threat score associated with one or more cyber-threat indicators. Threat scores can be generated based on threat intelligence data gathered from a variety of remote, heterogenous sources, such as network intrusion detection systems and other malware detection products (called "security controls") deployed in endpoints (referred to as Endpoint Detection and Response, or "EDR") or at network locations (referred to as network security detection systems), as well as human intelligence sources and cyber-incidence response investigations. In many known systems, however, the assimilation of such threat intelligence is performed manually, by a human expert employed as a security analyst. Unfortunately, qualified security analysts are in short supply, and moreover, the volume of cyber-threat indicators (referred to herein as "indicators") is significantly larger than could feasibly be manually managed by security analysts. For example, an organization may receive on the order of one million unique indicators in a single day. It would therefore be desirable to automate some or all of the security procedures historically performed by those individuals. Moreover, even when automated, the analysis of threat intelligence data can be hampered by the fact that the quality of the intelligence data and/or of the sources is often not well defined. For example, there may be no clear quality indicator for the sources providing intelligence data from the dark web. Additionally, different types of cyber-threat detection devices and devices from different manufacturers may be plagued by high incidences of false positives (FPs) or false negatives (FN), which makes their classifications (e.g., benign or malicious) of observed indicators less trustworthy. It would be desirable to take such classifications (verdicts) into account in a way that reflects their trustworthiness.

For instance, many commercially-available malware detection products monitor network traffic or monitor operations of an intelligent device (e.g., laptop or server) for indicators of compromise (i.e., threat indicators that may signal cyber-attacks). The events observed during operation of the device and/or flow of network traffic may be collected and logged. (To be clear, events are made up of one or more indicators, and capture their interactions, and classifiers classify events but usually not indicators themselves.) The malware detection products may be equipped with classification logic ("classifier"), or provide the content of their event logs to a remote classifier. The classifier classifies the events into suitable classes, for example, as benign or malicious. Unfortunately, the classifications reached are often inaccurate for a variety of reasons. This result may be caused by sophisticated malware simply evading detection, or by limitations in the detection/classification technology used by the malware detection product. For example, commercially-available network intrusion detection systems have historically been plagued by an enormous number of false positives. The volume of false positives can divert the attention of security personnel. Accuracy in classification is often difficult to attain due to lack of contextual information and the non-stationary nature of the maliciousness of some indicators over time as new attack tools, techniques, and procedures are utilized by perpetrators (threat actors). Embodiments of the invention take the quality of the sources, based on historical or experimental data, into account in generating cyber-threat scores for cyber-threat indicators. Although the historical data is not generally explicitly labeled, the quality can be inferred based on agreements/disagreements with other sources.

More specifically, cyber-security systems and methods set forth herein facilitate the curation, collation, enrichment, and analysis of threat intelligence data. Machine learning based tools are described herein that can be applied to threat indicators contained within the threat intelligence data, to formulate cyber-threat scores. Cyber-threat scores can represent a measure of confidence that the threat indicators relate to (or are indicative of) actual and actionable cyber-attacks. The cyber-threat score can be used to inform decisions regarding actions to be taken in response to detecting the indicated threats, such as issuing or prioritizing alerts and/or selecting, prioritizing or initiating remediations. Embodiments set forth herein automate and supplement the workflows of security analysts by using machine learning with trained models in the generation of cyber-threat scores, resulting in threat assessments that are more accurate and that are generated more quickly than can be realized using known approaches. Also, the training routine can be easily re-run so as to be responsive to change over time in the quality of a source.

A cyber-threat score can represent, or can be used to determine, for example, a type, severity and/or extent of a threat based on any of a variety of indicators or combinations of indicators, such as, for example, Internet Protocol (IP) address indicators, domain name indicators, uniform resource locator (URL) indicators, file hash indicators, or email addresses. In some embodiments, cyber-threat scores are generated without the use of labeled data (i.e., using only "unlabeled"/unsupervised data). In other embodiments, semi-supervised ML approaches can be used with both unlabeled data and a small quantity of labeled data.

Introduction to Cyber-Threat Score Generation

Cyber-threat scores described herein are generated using machine learning. For example, in some embodiments, one or more machine learning models are used to assess a "quality" of received and/or stored information about indicators provided by sources. The source can include, e.g., proprietary sources, Open Source Intelligence (OSINT) sources, human (analyst) input sources, etc., and combine the associated determinations into a coherent, aggregated score. The OSINT sources can provide information (including meta-information) and can be obtained from publicly available sources. The sources provide cybersecurity related information, including but not limited to indicators, which are included in data sets used as inputs into the ML models described herein. The quality of the sources is independent from the indicators. Cyber-threat scores can indicate how likely given indicators are to be directly involved with malicious activity, taking into account the available information. Cyber-threat scores can be used in a variety of applications, including threat intelligence, continuous breach monitoring, and threat hunting.

The term "machine learning model" (referred to herein as a "model" or "ML model") is an executable programmatic function that is trained for purposes of making a classification. An ML model is trained on a training data set and later executed during production on new data to draw inferences and thereby classify that new data. The new data set may include indicators or groups of indicators not previously classified. The machine learning model is generated by a machine learning training system which receives as input a training data set of unlabeled data as well as initial set of anchor values related to the source of the data. In some embodiments the training data set can be composed additionally of some labeled data (small portion) but the vast majority is unlabeled data.

As used herein, an "indicator" refers, for example, to an artifact of an actual or potential cyber-attack, often collected as a logged event in a computer system, device or network. For example, an indicator can be a source IP address, a destination IP address, a file hash, a uniform resource locator (URL), a domain name, or any other observed indication such as logged events that may provide evidence of a cyber-attack, though that indication may be potentially benign in nature. For example, an alert received by a system of the present disclosure might include (1) an indication of an IP address for the source of a communication that may be associated with an actual or potential cyber-attack (e.g., where the source of the communication may be a known or suspected malicious server), and (2) an indication of the domain name associated with that IP address. For each of the IP address and the domain name, separately, the system can access a data set of historical/stored intelligence for determining an associated cyber-threat score, as discussed further below. Indicators can be used as evidence in determining whether or not a cyber-attack has occurred. In some embodiments, multiple indicators can be combined to reach a determination and/or cyber-threat score.

Block Diagrams

FIG. 1 is a block diagram showing an example set of sources, according to some embodiments. As shown in FIG. 1, the sources 100 include one or more of each of: benign indicator lists (e.g., Malware Information Sharing Platform (MISP)) 100A, machine learning models 100B, cyber-security predictions or classifications, human analyst inputs 100C (e.g., received as input via a graphical user interface (GUI) of an analyst terminal, for example within a security operations center (SOC)), security controls and monitoring infrastructure 100D (e.g., network security detection devices and endpoint detection devices), botnet monitoring sources and/or third party threat feeds 100E. Each of sources 100A through 100E can be referred to as a "source type," and specific examples of sources falling under each source type category are provided in Appendix A. The inputs received from sources 100A through 100E are unlabeled data (i.e., the inputs do not include ground truth data regarding maliciousness or non-maliciousness (benign)). Each of sources 100A through 100E can have an associated latent notion of quality, in terms of whether they are effective at accurately identifying and differentiating indicators of different classes, e.g., malicious indicators and/or benign indicators. Each of sources 100A through 100E can be any of: remote from a monitored network, positioned within one or more monitored networks, a network-connected intelligent device, a peripheral device, positioned at an ingress to a monitored network, positioned at an ingress to a sub-network of a monitored network, positioned at an egress of a monitored network, positioned at an egress of a sub-network of a monitored network, data associated with monitored human activity (e.g., generated by monitoring discussion forums used by hackers), or third-party data related to one or more monitored networks or devices.

FIG. 2 is a block diagram showing an example machine learning based procedure 200 for generating a threat score (also referred to herein as a "cyber-threat score"), according to an embodiment. As shown in FIG. 2, the machine learning based procedure 200 includes a training phase 200A and an inference phase 200B. During the training phase 200A, anchor values (also referred to herein as "prior beliefs") for quality metrics are set at 202. The anchor values can be set, for example, by a subject matter expert (SME) or analyst (e.g., received as input via a GUI of an analyst terminal within a SOC). Alternatively, the anchor values can be set (by a user or by a processor) to a default or pre-defined value. Optionally, the approach allows for regularization whereby model parameters can be adjusted from their original anchor values during training via hard or soft constraints. In some embodiments, the regularization parameter can be set per-source, in which case, each source-specific regularization parameter would control how far the ML model can deviate from the set of initial quality values on a source-by-source basis. In some implementations, each source can be regarded as a dimension, and the regularization parameter serves as an indication of how far along that dimension the ML model can deviate (i.e., how far a value can deviate from the anchor value) during training.

At 204, indicators and their associated verdicts or classifications (e.g., maliciousness or non-maliciousness) are gathered from multiple sources (e.g., one or more of the sources shown and described with reference to FIG. 1). Such verdicts and classifications are referred to herein as "votes." As discussed above, in some implementations, the indicators and/or the votes received from the sources 100A through 100E are label-free (i.e., unlabeled data). In other implementations, a subset of labelled indicators can be included alongside the indicators and/or the votes. Note that multiple sources can encounter the same indicator because, for example, that indicator could be observed across multiple organization networks, each of which have their own security controls. As another example, malware might propagate throughout a network including the multiple sources. Thus, a given communication related to malware might be seen by sources throughout the network, and thus may subsequently be reported by multiple sources.

A "vote" is a classification or verdict with respect to one or more threat indicators. A vote comes from a source which may be human or a machine. For example, a "vote" related to an indicator may specify a classification, for example, of "malicious" or "benign" (non-malicious), or, in other embodiments (e.g., for other sources or at other times), "malicious," "benign" or "abstain" (the last also referred to herein as a lack of a vote). Votes may not have been cast due to a particular source not being operative at the time of an event, or not having observed an event seen by one or more other sources. The categories used in classification are specific to the implementation of the classifier and/or to the analysis domain. Some sources from the multiple sources may supply votes for a first subset of indicators, while other sources from the multiple sources may supply votes for a second subset of indicators, where the first subset of indicators and the second subset of indicators may only partially overlap or may not overlap at all. In other words, for a given indicator, only a subset of sources from the multiple sources may have supplied a vote for that indicator, while others may have abstained. In some implementations, sources supply votes in response to requests issued by a system or systems of the present disclosure. In other implementations, sources supply votes to a system or systems of the present disclosure automatically and/or not in response to requests (e.g., as part of a subscription to a feed or as new data is generated). In still other implementations, votes are supplied to a system or systems of the present disclosure in part in response to requests, and in part automatically (not in response to requests).

In some implementations, at least one of the sources has an associated amount of error(s) in its determinations (i.e., signal to noise ratio), which describes the potential for inaccuracy in the source's vote. At 206, a ML analysis of agreements and disagreements among the votes is performed (e.g., using an algorithm capable of learning from weak forms of supervision) and the anchor values set at 202 may be adjusted by the ML model based on the analysis (and, optionally, taking into account the constraint value(s), if any). Examples of weak supervision techniques compatible with embodiments of the present disclosure can be found, by way of non-limiting example only, in: "Snuba: Automating Weak Supervision to Label Training Data" by P. Varma, et al., Proceedings VLDB Endowment, 12(3): 223-236 (2018); "Snorkel: Rapid Training Data Creation with Weak Supervision," by A. Ratner, et al., The VLDB Journal, 29, 709-730 (2020); "Snorkel DryBell: A Case Study in Deploying Weak Supervision at Industrial Scale," by S. H. Bach, et al., SIGMOD '19: Proceedings of the 2019 International Conference on Management of Data, 362-375 (2019); and "Self-Training with Weak Supervision," by G. Karamanolakis, et al., Proceedings of the 2021 Conference of the North American Chapter of the Association for Computational Linguistics: Human Language Technologies," 845-863 (2021), the entire contents of each of which are incorporated by reference herein in their entireties for all purposes.

Note that one source may be more accurate in alerting on or accurately identifying actual threats than another source, and that differential can be applied in some embodiments to improve prediction of cyber-threats in machine learning techniques. This approach can be data-driven, and the approach can be implemented without supervision. Further information on ML technology, including ML models and their weight parameters, can be found in U.S. Pat. No. 11,108,809, titled "System and method for analyzing binary code for malware classification using artificial neural network techniques," and in United States Patent Application Publication Number 2021/0314333, titled "Churn-Aware Machine Learning for Cybersecurity Threat Detection," the entire contents of which are incorporated herein in their entireties for all purposes.

The ML analysis at 206 includes generating a set of quality metrics for each source from the multiple sources. In some embodiments, each set of quality metrics is generated based on (i) how often the associated source votes (i.e., does not abstain), (ii) which other sources from the multiple sources that source agrees with, (iii) which other sources from the multiple sources that source disagrees with, and (iv) the observed correlation among the sources in agreement or disagreement with that source. In general, quality metrics improve when a given source votes (i.e., does not abstain) on a large volume of indicators and agrees with a wide variety of other sources. Conversely, quality metrics tend to degrade when a given source rarely votes, does not vote, disagrees with a wide variety of other sources, or agrees with only a small subset of correlated sources.

As a consequence of the ML analysis at 206, a plurality of "quality metrics" for each source are output at 208. These quality metrics can be used as parameters of the ML model. The plurality of quality metrics can, collectively, be referred to as the parameters of the trained ML model. Parameterization of ML models and parameter use during training is, generally speaking, well known to those of ordinary skill in the art of data science and machine learning. Steps 204 and 206 can be collectively referred to as the data-driven adjustment or learning component of the training phase 200A. It should be noted that this procedure does not require ground truth or supervision.

As shown in FIG. 2, in an embodiment involving a binary classification into malicious or benign classes, the quality metrics can, include a true positive ("TP") rate, a false positive ("FP") rate, a true negative ("TN") rate, and a false negative ("FN") rate. In some implementations, the plurality of quality metrics remains constant until the ML model is retrained. Retraining of the ML model can be triggered, for example, any of one or more of the following: (1) in response to detecting drift in the performance of an underlying source (such that the trained ML model may no longer be accurate), (2) in response to detecting drift in the ML model performance, for example due to a degradation in the quality or relevance of the training data set, and (3) based on a predefined schedule (e.g., every six months). As used herein, the "quality" of a source can be represented collectively by the TP, FP, TN, and FN rates, and can indicate a credibility, trustworthiness, or reliability of that source. The quality of a source can evolve (i.e., degrade or improve) over time, for a variety of reasons, and this can be reflected via adjustments to the TP, FP, TN, and FN rates, e.g., via retraining of the ML model, for example via a feedback loop in which outputs from the inference phase, metadata, source data, and/or indicator data can be used to retrain the ML model.

In one example implementation, votes from three different sources can be identified at 212. The three different sources can be (1) intelligence analyst inputs (e.g., 100C of FIG. 1), (2) a third party threat feed (e.g., 100E of FIGS. 1), and (3) an ML model serving as an indicator source (e.g., 100B of FIG. 1), and their votes might be as shown in Table 1, below:

TABLE 1

| Example source votes and applicable quality metrics for a given indicator | | |
|---|---|---|
| Source | Vote | Quality Metrics Applied (%) |
| intelligence analyst inputs | malicious, benign, abstain | TP, FP, TN, FN |
| third party threat feed | malicious, abstain | TP, FP |
| ML model | malicious, benign, abstain | TP, FP, TN, FN |

As shown in Table 1, when a source votes "malicious," the applicable quality metrics are TP and FP, whereas when a source votes "benign," the applicable quality metrics are TN and FN. It is possible for the intelligence analyst or another source to vote for both classes of malicious and benign. As such, in the binary classification setting, it might be useful to refer to those sources that only provide votes regarding an indicator for one class as 'unipolar' and those for both classes as bipolar.

Table 2, below, shows an example visualization of relationships among indicators, sources, and votes. As shown in Table 2, in an example implementation, indicators may be presented as rows, sources may be presented as columns, and each cell may represent a vote.

TABLE 2

| Example visualization of indicators, sources, and votes | | | | |
|---|---|---|---|---|
| Indicator: | Source 1: Benign Indicator List | Source 2: Intel Analyst Inputs | Source 3: Third Party Threat Feed | Source 4: ML Model |
| IP address #1 | abstain | benign | malicious | malicious |
| IP address #2 | abstain | malicious | abstain | malicious |
| File hash | benign | malicious | malicious | benign |
| URL | benign | malicious | abstain | malicious |

During the inference phase 200B, a new indicator is received (e.g., at a SOC compute device) at 210. The indicator can be, for example, part of a received alert message. When received as part of an alert message, the alert message may be parsed and one or more indicators may be extracted. When multiple indicators are extracted, each indicator may be analyzed and scored independently of the others. In response to receiving the new indicator at 210, at least one vote is identified for the new indicator for each source from at least a subset of the sources (e.g., one or more of the sources shown and described with reference to FIG. 1), at 212, that had previously voted with respect to that new indicator. Alternatively, or in addition, external information (outside of the vote from the source that produced the current indicator) can be consulted and taken into consideration by actively querying a system that provides contextual information (e.g., in the form of metadata) about the indicator. Such systems can include, by way of example, additional ML models, intelligence analyst databases, etc. These external information sources are also 'sources' in the sense used above, and, in order to use them during the inference phase 200B, should be used in the training phase 200A as well (though not necessarily for the same indicator).

A cyber-threat score is then generated at 214 (in some embodiments, using machine learning), based on the quality metrics and the votes for the new indicator. Note that, as discussed above, not all sources may have previously provided a vote for a given indicator. One or more of the sources from which information was gathered during training may have "abstained" from voting, e.g., due to a lack of applicable information to vote. As part of the cyber-threat score determination at 214, each of the votes (from non-abstaining sources) may be weighted (e.g., using Bayesian probability) based on the quality metrics determined at 208 for the sources in the subset of sources, and the weighted votes can be aggregated and normalized into the cyber-threat score (e.g., within a scale from 0 to 1), which is an over-arching probability of trustworthiness in the classification for that new indicator. While the description in this paragraph and the following paragraphs relate for purposes of ease in description to a single new indicator, the embodiments contemplate the use of this approach for patterns or other sets of indicators where the weight may be assigned to the set rather than or in addition to weights being assigned to individual indicator(s) within the set. For example, as discussed above with reference to certain embodiments, threat scores may be combined via propagation through a semantic (knowledge) graph. Score generation is further described in the Appendix A.

In some embodiments, a system for performing cyber-security analysis as discussed herein includes (1) software to train the ML model, (2) software to gather metadata, and optionally (3) software to perform inferences based on newly-received indicators. Each of these software components may be co-located in a single compute device or may be distributed across multiple compute devices that are in wired or wireless communication with one another via a communications network. For example, the training phase 200A and the inference phase 200B of FIG. 3 may be performed on a common compute device, or on separate compute devices. In some implementations, none of the software to train the ML model, the software to gather metadata, or the optional software to perform inferences resides on an analyst terminal, but rather the analyst terminal may have access to the cyber-threat scores (e.g., via communication with a remote compute device) once they have been generated.

Figure 3:
FIG. 3 is a system diagram showing an example system for cyber-threat score generation, according to some embodiments.

FIG. 3 is a system diagram showing an example system for cyber-threat score generation, according to some embodiments. As shown in FIG. 3, the system 300 includes a cyber-threat score generator 310, implemented in hardware and software, and including a memory 312 operably coupled to a processor 314, which in turn is operably coupled to a transceiver 316 and an optional user interface 318 (e.g., software to implement a graphical user interface (GUI) for display via a display device. The optional user interface 318 can be used by an administrative user (Admin A in FIG. 3), for example, to observe, maintain, or adjust the functioning of the cyber-threat score generator 310. The system 300 also includes remote analyst terminals 320A, 320B that are in communication with the cyber-threat score generator 310 via a network N (e.g., a wireless communications network), for example to receive cyber-threat scores 322A, 322B (optionally in response to queries sent from the analyst terminals 320A, 320B to the cyber-threat score generator 310; not shown). The system 300 also includes one or more remote sources 324 in communication with the cyber-threat score generator 310 via the network N, for example to provide unlabeled data sets 326 to the cyber-threat score generator 310. The one or more remote sources 324 can include any of the sources shown and described with reference to FIG. 1. The memory 312 stores instructions 312G (e.g., to perform the procedure shown and described with reference to FIG. 2 above, and/or the method 400 of FIG. 4, discussed below), including instructions to generate cyber-threat scores, and optionally data associated with one or more of: sources 312A, votes 312B, indicators 312C, anchor values 312D, cyber-threat scores 312E, and quality metrics 312F.

FIG. 4 is a flow chart showing a method for training an ML model and generating a cyber-threat score based on a new indicator, according to some embodiments. As shown in FIG. 4, the method 400 includes receiving, at 402 and at a compute device, a set of initial quality values indicative of a starting estimate of qualities of a set of sources, and at 404, receiving an unlabeled data set including a set of cyber-threat indicators and a first set of votes from each source in the set of sources. Each of the votes is associated with one of the cyber-threat indicators. The first set of votes received at 404 pertains to the set of cyber-threat indicators at a snapshot in time (e.g., a source may vote benign at a first point in time but malicious at a later point in time for the same indicator). An ML model is trained at 406, based on at least one of (1) agreements among the sets of votes, (2) disagreements among the sets of votes, and (3) the set of initial set of anchor values, to produce a trained ML model.

The training of the ML model can include optimizing the quality metrics (FP, FN, TP, TN) for each source, using a loss function that represents the agreements among the sets of votes and/or the disagreements among the sets of votes. During training, the anchor values can be iteratively refined as parameters of the ML model to generate learned quality values. Votes from sources with low learned quality values will have votes weighted lower than sources with high learned quality values. The magnitude and variation in the learned quality values can be determined during training from the unlabeled data set. The trained model can thus include parameters based on the learned quality values which reflect the quality metrics (FP, FN, TP, TN) of the sources, as discussed above. Upon completion of training, the ML model is ready for use in the interference phase to identify threats, where it can be applied to protect an organization from cyber-attack.

In response to receiving a new cyber-threat indicator at 408, votes are identified at 410 for each source from a subset of the set of sources, to define a second set of votes. A cyber-threat score is generated at 412 for the new cyber-threat indicator based on the trained ML model and the second set of votes. At 414, a signal is sent via the compute device to cause at least one of display via a graphical user interface (GUI) (e.g., at one or more analyst terminals (e.g., compute devices), such as analyst terminals 320A, 320B of FIG. 3) or storage of the cyber-threat score (e.g., in a memory of a cyber-threat score generator, such as memory 312 of cyber-threat score generator 310 of FIG. 3, and/or at one or more analyst terminals, such as analyst terminals 320A, 320B of FIG. 3). In some implementations, one or more reports may be generated and displayed at the analyst terminals 320A, 320B of FIG. 3. Such reports may be generated at the analyst terminals 320A, 320B themselves, or may be generated by the cyber-threat score generator (e.g., cyber-threat score generator 310 of FIG. 3) and transmitted to the analyst terminals 320A, 320B for display thereon.

In some implementations, the cyber-threat score can be used by the analyst terminals 320A, 320B to initiate or trigger a response to the cyber-threat, including issuance of alerts and/or initiation of one or more actions such as a remediation action and an investigation action (e.g., to gather more information, such as through another form of analysis). Remediations can be implemented automatically, semi-automatically (i.e., automatically generating user-selectable options), or can be implemented by a human in response to the cyber-threat score and/or other alert. In some implementations, the generation of the cyber-threat score at 412 is further based on neighborhood data, as discussed in the "Leveraging Neighborhood Data" section below, but only when a predefined set of conditions is met (e.g., wherein a number of votes in the second plurality of votes is less than a predefined number of votes, e.g., 2). Alternatively, or in addition, the generation of the cyber-threat score at 412 can further be based on one or more "enrichments," whereby information is retrieved about a given source for which no votes have yet been collected and/or whereby information is retrieved about a given indicator for which no historical data/votes have yet been collected.

By way of recapping and extending salient points in the foregoing description, in some embodiments, a cyber-security analysis method includes receiving, at a compute device, a plurality of quality values. Each quality value from the plurality of quality values represents a competency of a source from a plurality of sources. The method also includes receiving, at the compute device and from each source from a plurality of sources, an unlabeled data set including a plurality of cyber-threat indicators and a plurality of votes. Each vote from the plurality of votes is associated with a cyber-threat indicator from the plurality of cyber-threat indicators. The method also includes training the ML model based on (1) at least one of and, in some embodiments, both of: agreements among the pluralities of votes, and disagreements among the pluralities of votes, and (2) a plurality of quality values, to produce a trained ML model for generating a cyber-threat score.

In some embodiments, the ML model is trained using a succession of one or more sets of the quality values in setting parameters of the ML model to optimize the classification accuracy of the ML model. The parameters are initially set based on the initial quality values, and subsequently adjusted based on empirically-determined, learned quality values during training. The learned quality values are based on the quality metrics (e.g., TP, FP, TN, FN, as computed for the results (indicator classifications) produced by the ML model and constrained by the anchor values), which, in turn, are based on the agreements and disagreements among the non-abstaining sources with respect to their votes. Once quality metrics are determined for each source, they can be combined into a single probability, where, when a source 'votes' on a determination, that vote is weighted by the learned quality metrics. After the accuracy of the ML model in classifying indicators reaches a level of confidence, the ML model is ready for use in production during an inference phase.

During the inference phase, in some embodiments, the cyber-security analysis method can input new, unlabeled data including one or more cyber-security indicators to be classified. The trained ML model processes this input data to classify the indicators extracted from the data set. The method generates a cyber-threat score (sometimes referred to as "M-Score" by the assignee of the present application) for the classification. The cyber-threat score represents the probability of maliciousness of one or more indicators in the data. The cyber-threat score can also be provided to an analyst to guide the analyst's response to the classifications, particularly where a cybersecurity attack has been indicated and found credible.

Label Guideposts

In some embodiments, in a semi-supervised aspect of the approach, "label guideposts" can be generated based on collected labelled data that is known or determined to have been accurate (i.e., true), or known or determined to have been inaccurate (i.e., false). Thus, the label guideposts can be viewed as representing ground truth data, and, as such, can be used to validate or verify an indicator's classification as, for example, maliciousness or non-maliciousness (benign). These label guideposts can be used during the training phase 200A to adjust weights associated with sources, alongside the assessments of agreement and disagreement based on unlabeled data discussed above, as part of the generation of parameters for the machine learning model. As discussed above, steps such as 204 and 206 of method 200 in FIG. 2 are data-driven and can be performed in some embodiments without labels on the training data; however, in some implementations, labels serving as guideposts can be incorporated into those steps, to obtain improved quality estimates of sources providing votes and ultimately accuracy of classifications, as contrasted with a purely unsupervised approach. In other words, data including ground truth data (e.g., labeled indicators) regarding maliciousness or non-maliciousness are included within the data set, along with unlabeled data, and the ML model can use the known ground truths to further adjust the weights. Such labeled data comprise high confidence labels associated with previously observed indicators that can be used in training. Even if the labeled data comprises only a small fraction of the total training data, they can help the ML model decide which agreements (or disagreements) are good and which are not. This effectively reduces the noise that may exist in the training process due to specious agreements.

Embodiments of the invention can thus use a small quantity of labeled indicators (e.g., a set of one or more) during training of the ML model, in addition to a relatively larger quantity of the unlabeled indicators. By leveraging only a small quantity of labeled data, these embodiments overcome the lack of available data in collecting a larger quantity of labeled data. As noted previously, the labeled data reflect indicators that have been previously classified by a trusted security analyst or other expediency and appropriately labeled. The labels constrain changes in the anchor values to ensure the quality metrics, as learned by the ML model, to remain substantially consistent with the ground truths represented by the labels, or at least more consistent than if no labeled indicators were used in the training data set.

Selection of the quantity and/or coverage of the labeled indicators samples can be optimized to improve accuracy of the ML model's classifications. The labeled indicators are of a sufficient quantity and represent categories (explained below) to ensure "coverage." Other times, in other embodiments, the labeled indicators are selected to reduce "uncertainty." These will be described in greater detail in the discussion that follows.

Selecting Labeled Indicators to Optimize for Coverage:

To optimize for coverage, embodiments of the invention select labeled indicators to ensure a relatively complete and uniform coverage over underlying sources and categories of indicators. Where these embodiments are expected to classify indicators of potential cyber-attacks, the categories can correspond to types of attacks (such as phishing, spam, botnets, advanced persistent threats, ransomware, etc.). Consequently, these embodiments can stratify and sample labeled indicators to include a representative set of labeled indicators corresponding to different categories of attack, for example, those prevalent in the then current threat landscape or categories of attacks of most concern to potential victims. For this, representative unlabeled indicators can be furnished to a cyber-security analyst or other SME for sorting (as to category) and labeling and the resulting labeled indicators included in the training data set of the ML model. Other potential stratification options might include the organization or type of organization (e.g., industry (e.g., financial or banking companies), business vs. government agency, etc.) that is associated with the indicator (for example, or other operational properties of the indicators themselves (such as CIDR block, ASN, domain registrar, etc.). Moreover, embodiments of the invention can select labeled indicators to ensure a relatively and substantially complete and uniform coverage over different types of underlying sources of indicators.

In embodiments that employ semantic graphs, embodiments can select labeled indicator samples to optimize for coverage that provide broad coverage over the semantic graph induced by the functional relationships among the indicators. This might include indicators that have the highest centrality in the graph (as measured by standard graph centrality measures like betweenness centrality) or which have high PageRank values.

Selecting Labeled Indicators to Optimize for Uncertainty:

When referring to uncertainty, the information available about the quality of the source (as gleaned from the agreements/disagreements) has a high degree of variance and therefore cannot give rise to confidence that the quality estimate provided by the ML model during training is reflective of the true quality of the given source(s).

Some embodiments select labeled indicators optimized by minimizing uncertainty. After generating an initial ML model and generating threat scores for a test set, a subset of indicator samples can be provided (along with their resultant threat scores) to SMEs for labeling. This set of indicators can be selected using one or more of the approaches just described. The indicators that have disagreements with SME labels would be incorporated into an iterative training cycle to 'fix' the disagreements (i.e., verdict inconsistencies) by adjusting the model parameters (quality metrics) to better match the SME determinations. This can happen in an active learning-like cycle that allows for semi-automated refinement of the ML model and its parameters simply by incorporating the SME-labeled samples.

Finally, in the same or other embodiments, the selection of the labeled indicators can be optimized for uncertainty to ensure that the verdicts on indicators and/or their originating sources (e.g., security analysts, threat intelligence feeds, and third-party enrichment services) with the highest degree of uncertainty are represented or even over-represented in the training data set. Uncertainty here could be determined by looking at the number of verdict disagreements that a given source has and the variety of other sources with which that given source disagrees with. By using the labeled indicator samples in the training data set, the ML model would be able to better understand which of the disagreeing sources is truly correct and adjust the ML model parameters (quality metrics) accordingly.

In some implementations, when label guideposts are employed (i.e., a semi-supervised setting), the training of the ML model can include optimizing the quality metrics (FP, FN, TP, TN) for each source, using (1) a loss function that represents the agreements among the sets of votes and/or the disagreements among the sets of votes and (2) supervised loss that leverages the ground truth data (e.g., binary cross-entropy loss). In some implementations, each of the unlabeled data and the labeled data is applied in the form of a loss function that can optionally be optimized. The loss functions can then be combined as part of the cyber-threat score generation. Such loss functions can be regarded as "forcing functions" that prevent the quality metrics from going astray.

Use of Semantic Graphs and Subgraphs

In an embodiment of the invention, indicators can be stored, for example, as a semantic (knowledge) graph, with nodes representing indicators and edges representing semantic relationships between or among the indicators. Such semantic relationships represent a determinable association, based on a functional relationship such as a predefined operational aspect or observed interaction, related to connected indicators (i.e., nodes linked according to an edge). The observed interaction may relate to indicator types. The term "type" refers to categories defined by a network, file or other protocol specification applicable to an observed indicator, the specification describing the inter-relationship or interaction between such indicators. The specification may be a public specification such as, for example, DNS (RFC 1034-1035), SMTP (RFC 2821), etc. or a proprietary specification. In some embodiments, the relationships are determined by observations associated with observed network traffic, monitored compute device operation and other stored events captured by the threat indicators.

In some embodiments, indicators (e.g., URL, domain, IP address, etc.) can be stored and managed as nodes of a semantic graph and inter-related by edges that chain them together. A semantic graph is a representation or data arrangement that represents semantic relationships between elements. For example, a node may represent a first cyber-threat indicator node, such as a URL (https://malware.me), which is linked to a second cyber-threat indicator node, such as a malicious binary. Each node may be associated with certain characteristic attributes and each link represents relationships between those nodes (and impliedly, those characteristic attributes). In the preceding example, the link between the two nodes indicates a relationship that the binary was provided by the server associated with the URL. Here, for example, a domain node may have an edge emanating from it to each of the IP address nodes that the domain node resolves to. Thus, one may ascertain, by referring to the semantic graph, that a given domain resolves to a particular IP address.

Threat scores that are generated for each indicator can be propagated up or down the semantic graph, such that they influence the threat scores of other nodes in the hierarchical chain and are combined in a meaningful way. The hierarchical chain can be identified by a functional relationship forming a hierarchy between, or among, the nodes, for example, as prescribed by an applicable protocol specification. Examples of use of semantic graphs in cybersecurity as well as propagation of scores within the graphs can be found U.S. patent application Ser. No. 16/370,199, filed Mar. 29, 2019, and titled "System and Method for Adaptive Graphical Depiction and Selective Remediation of Cybersecurity Threats," the entire contents of which are incorporated by reference herein in their entirety for all purposes.

In some cases, a subset of indicators in the semantic graph can be scored using cyber-threat scores described herein, and propagated throughout the semantic graph to combine and aggregate information of related indicators. In other embodiments, each cyber-threat score is associated with only one indicator. In some implementations, a higher cyber-threat score is indicative of a higher degree of confidence that the associated indicator(s) is associated with malicious activity, while a lower cyber-threat score is indicative of a lower degree of confidence (or a lack of confidence) that the associated indicator(s) is associated with malicious activity.

Leveraging Neighborhood Data

In some cases, an alert referencing a new indicator may be received by the analyst terminal, accompanied by few non-abstaining votes or even no non-abstaining votes. In other words, in some cases, only a limited number of sources have classified a detected indicator, or most or all of the sources for which event data has been gathered have abstained with respect to an indicator included in the event data. In such instances, the ML model cannot provide a confident prediction of the maliciousness of that new indicator. At most, the ML model would assign a neutral 0.5 probability ("coin flip").

In some embodiments, the new indicator may be analyzed differently, in that inferences can be made for that new indicator based on prior observations of other indicators within a "neighborhood" of the current indicator being scored. This can be understood as viewing a potential cyber-threat at a different resolution or scale, such as from the point of view of a network and its sub-networks, different sub-networks of the same network, or the same sub-network (destination or source), the same company/ organization, the same node type, or the same set of assets/ devices, in a "guilt by association" approach. In other words, neighborhood cyber-threat score data and/or historical votes associated with a previously observed indicator can be leveraged to compute the cyber-threat score of the new indicator.

As an illustrative example, a "domain neighborhood" can be defined in terms of a domain name, which is managed by domain servers of an organization. The classification of an indicator pertaining to a domain name may be enhanced based on information regarding indicators pertaining to other domains managed by the domain servers or pertaining to the same organization.

A further embodiment of this concept centers on an IP neighborhood. An IP neighborhood can include an IP address which is part of an IP subnet, which in turn is part of an autonomous system (AS) of an organization. For example, given an IP address as an indicator to classify where no information or little information is available, information for a known-malicious server in the same organization can be used to assign a higher probability than the quality metrics might indicate. As another example, suppose there are three IP addresses for which information has been collected. The neighborhood process can include determining which sources have previously voted on those three IP addresses. That information can then be aggregated, statistically combined, or the most malicious vote or the majority vote can be selected. As part of this process, the training data can be analyzed, and subsets thereof can be aggregated into hierarchical groups (e.g., organized by autonomous system (AS), subnet, etc.). Aggregation can then be performed for each group, and the associated determinations of the sources can be stored.

In some implementations, neighborhood data is collected/ compiled from the unlabeled data received, for example, at step 404 of FIG. 4. The neighborhood data can be extracted, for example, from metadata of the unlabeled data during the training phase (e.g., training phase 200A of FIG. 2), and indexed for subsequent retrieval and analysis during the inference phase (e.g., inference phase 200B of FIG. 2). As discussed above, neighborhood data may be taken into account during the generation of the cyber-threat score (e.g., at 412 in FIG. 4), either automatically or in response to a predefined set of conditions being met (e.g., wherein a number of votes in the second plurality of votes is less than a predefined number of votes, e.g., 2).

In some embodiments, the neighborhood can be treated as having a number of ranges of proximity to the indicator in question, like concentric circles about that indicator, and each range or circle can be associated with a different probability of accuracy to be afforded the indicator, as illustrated in the Appendix A under the heading "Guilt by Association." Essentially, the accuracy to be assigned to the indicator can thus depend on (and be based on) the degree of consanguinity of the source or the indicator to other known and rated sources or indicators used as comparables. Here, referring to a domain neighborhood as an example, the proximity is the size and concentration of the administrative domain containing the IUE. A subnet is usually administered by a single group within a large organization. An ASN comprising multiple subnets, might be run by a much larger and more diverse set of administrators. The idea of guilt-by-association is stronger for the administrative domains run by a single administrator—a single administrator is likely to have the same security issues throughout their domain of administration and so indicators from the same domain are likely to reflect similar threat scores.

In some embodiments, a cyber-security analysis method includes receiving, at a compute device, a representation of a cyber-threat indicator, and identifying, via the compute device and based on the cyber-threat indicator, a plurality of votes. The method also includes generating, via the compute device, a cyber-threat score for the cyber-threat indicator based on (1) a trained ML model, (2) the plurality of votes, and (3) one or more previously classified a cyber-threat indicators related to previously observed events within a common neighborhood. For clarity, the previously classified indicators may be used in the training data set as labeled data to improve the cyber-threat score, as explained elsewhere herein. The observed events may be preserved in logs and reported by one or more sources. The method also includes sending, via the compute device, a signal to cause at least one of display via a graphical user interface (GUI) or storage of the cyber-threat score.

While various embodiments have been described above, it should be understood that they have been presented by way of example only, and not limitation. Where methods and/or schematics described above indicate certain events and/or flow patterns occurring in a certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) thereon may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A cyber-security analysis method, comprising:

receiving, at a compute device, a representation of a first threat indicator and an associated classification of the first threat indicator;

identifying, via the compute device and based on the classification of the first threat indicator, at least one vote from a source;

executing a trained machine-learning (ML) model to generate, via the compute device, a cyber-threat score for the first threat indicator based on (1) the at least one vote associated with the first threat indicator, and (2) at least one vote associated with a prior observation of a second threat indicator having a functional or operational relationship to the first threat indicator;

detecting, via the compute device, data drift of the trained ML model based on the cyber-threat score and the at least one vote; and retraining, via the compute device, the trained ML model based on a comparison of the data drift to a predetermined threshold; and in response to a plurality of sources failing to provide sufficient vote information associated with the first threat indicator, searching for the second threat indicator in one or more administrative domains that encompass the first threat indicator to gather at least one additional vote.

2. The cyber-security analysis method of claim 1, further comprising determining the relationship based on at least one of observation of the second threat indicator associated with observed network traffic, an observation of the second indicator during monitoring of a compute device operation, and an observation of the second indicator during analysis of stored events.

3. The cyber-security analysis method of claim 1, wherein the first and second threat indicators having an operational relationship based on a first administrative domain encapsulating the first threat indicator and a second administrative domain encapsulating the second threat indicator.

4. The cyber-security analysis method of claim 3, wherein the first and second administrative domains each comprises one of an IP neighborhood or a domain neighborhood where the first and second threat indicators correspond to IP addresses or to domain names, respectively.

5. The cyber-security analysis method of claim 3, wherein the administrative domains corresponding to the first and second threat indicators are under common ownership.

6. The cyber-security analysis method of claim 1, wherein the first and second threat indicators have an operational relationship comprising a common administrative domain.

7. The cyber-security analysis method of claim 1, wherein executing a trained ML model to generate the cyber-threat score for the first threat indicator comprises employing a threat score associated with the second threat indicator in generating the threat score for the first threat indicator.

8. The cyber-security analysis method of claim 1, further comprising receiving a plurality of verdicts with respect to the first threat indicator, each of the verdicts originating from an associated source of a plurality of sources and serving as a vote from the associated source.

9. The cyber-security analysis method of claim 1, wherein the first threat indicator comprises an IP address; and wherein searching for the second threat indicator comprises searching, for the second threat indicator in at least one of an IP subnet corresponding to the first threat indicator, an autonomous system corresponding to the first threat indicator, and an owning organization corresponding to the first threat indicator.

10. The cyber-security analysis method of claim 1, further comprising:

receiving a first verdict for the first threat indicator from each source of a first subset of sources of a plurality of sources, receiving a second verdict for the second threat indicator from each source of a second subset of sources of the plurality of sources, where the second threat indicator is associated with a same administrative domain as the first threat indicator, each of the first and each of the second verdicts serving as a vote; and generating a threat score based on a combination of the votes for the first and second indicators.

11. The cyber-security analysis method of claim 1, wherein the operational relationship is such that the first threat indicator and the second threat indicator have a common autonomous system.

12. The cyber-security analysis method of claim 1, wherein the operational relationship is such that the first threat indicator and the second threat indicator have a common associated subnet.

13. The cyber-security analysis method of claim 1, further comprising identifying the at least one prior observation of the second threat indicator based on meta data related to the first threat indicator received prior to the identifying the at least one prior observation of the second threat indicator.

14. The cyber-security analysis method of claim 1, further comprising identifying the prior observation of the second threat indicator based on an index of prior observations of a plurality of threat indicators stored in a memory of the compute device.

15. A cyber-security analysis method, comprising:

receiving, at a compute device, a representation of a first threat indicator;

identifying at least one prior observation of a second threat indicator having a predefined operational relationship to the first threat indicator;

executing a trained machine-learning (ML) model to generate, via the compute device, a cyber-threat score for the first threat indicator based on (1) at least one available vote on the first threat indicator from a plurality of sources, and (2) at least one vote for the at least one prior observation of the second threat indicator;

detecting, via the compute device, data drift of the trained ML model based on the cyber-threat score and the at least one prior observation; and retraining, via the compute device, the trained ML model based on a comparison of the data drift to a predetermined threshold; and in response to a plurality of sources failing to provide sufficient vote information associated with the first threat indicator, searching for the second threat indicator in one or more administrative domains that encompass the first threat indicator to gather at least one additional vote.

16. The cyber-security analysis method of claim 15, wherein the at least one prior observation of the second threat indicator captures an event during operation of a computer system or flow of network traffic that signifies either a benign occurrence or a potential cyber-threat.

17. The cyber-security analysis method of claim 15, wherein executing the trained ML model to generate, via the compute device, the cyber-threat score includes obtaining a vote from at least one source based on the prior observation of the second threat indicator.

18. The cyber-security analysis method of claim 15, wherein the at least one vote from the plurality of sources includes a plurality of votes from a plurality of the sources; and executing the trained ML model to generate, via the compute device, the cyber-threat score includes combining the plurality of vote on the first threat indicator with the at least one vote for the at least one prior observation of the second threat indicator.

19. The cyber-security analysis method of claim 15, further comprising: determining, at the compute device, that a threshold number of votes from the plurality of sources on the first threat indicator has not been met; and identifying, via the compute device and in response to determining that the threshold number of votes has not been met, the at least one prior observation of the second threat indicator.

20. The cyber-security analysis method of claim 15, wherein the threshold is based on a number of sources of the plurality of sources casting votes on the first threat indicator.

21. The cyber-security analysis method of claim 15, further comprising: weighting the pre-existing votes on the second threat indicator based on at least a degree of proximity within the administrative domain between the first threat indicator and the second threat indicator to form weighted values; combining the weighted values in forming the cyber-threat score for the first threat indicator.

\* \* \* \* \*